United States Patent
Boeck

[15] 3,700,301
[45] Oct. 24, 1972

[54] SELF-LOCKING LATCH MECHANISM
[72] Inventor: Gunther A. Boeck, Northridge, Calif.
[73] Assignee: Keystone Engineering Company, Los Angeles, Calif.
[22] Filed: Oct. 19, 1970
[21] Appl. No.: 81,927

[52] U.S. Cl. .................312/333, 312/215, 312/348
[51] Int. Cl. ............................................A47b 88/16
[58] Field of Search......312/333, 348, 215, 218, 219, 312/331

[56] References Cited
UNITED STATES PATENTS 1,000,268  8/1911  Jadronja....................312/333
1,730,391  10/1929  Stobba......................312/333
1,681,383  8/1928  Walsh........................312/333
1,902,795  3/1933  Wolters.....................312/331

Primary Examiner—Bobby R. Gay
Assistant Examiner—Darrell Marquette
Attorney—Sellers and Brace

[57] ABSTRACT

A self-locking positive latch mechanism for use between a pair of relatively slidable structures for holding the latter selectively in any one of many different positions. Spring means function to hold the parts in their normal positive locking position except when manually held unlocked.

15 Claims, 7 Drawing Figures

Patented Oct. 24, 1972
3,700,301
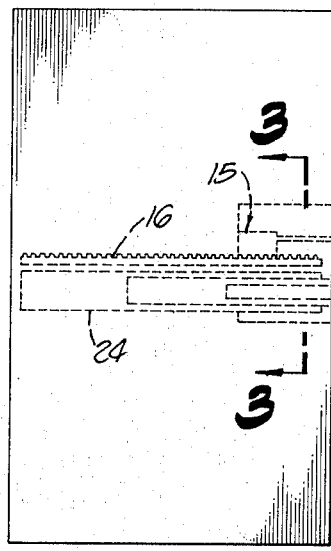
FIG. 1.
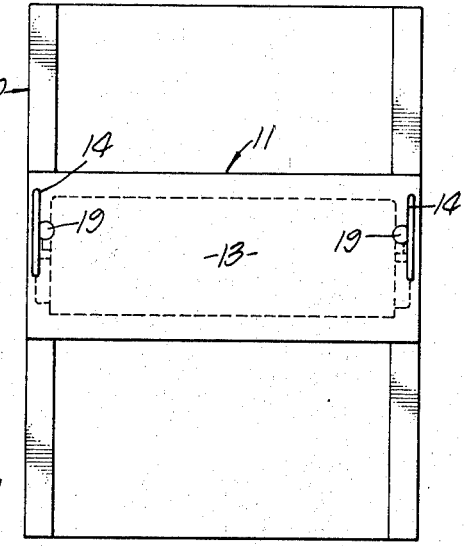
FIG. 2.
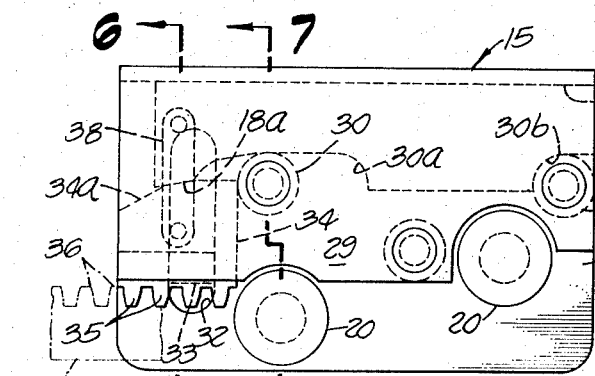
FIG. 4.
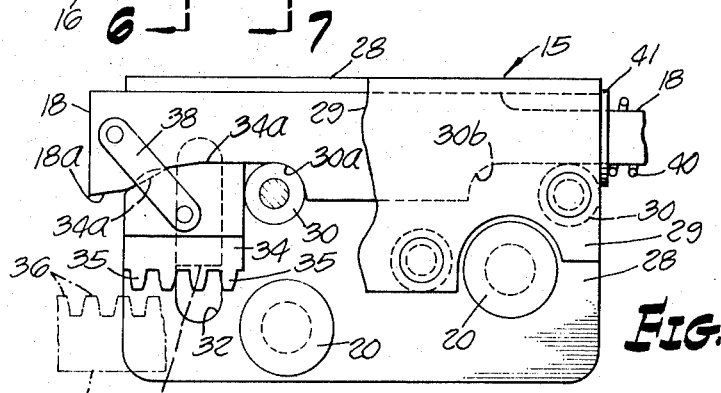
FIG. 5.
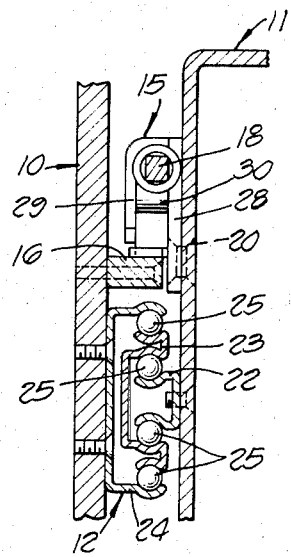
FIG. 3.
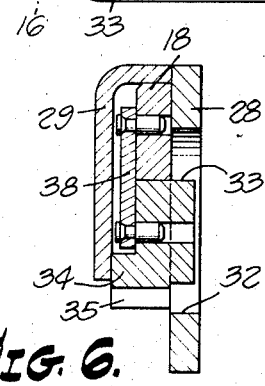
FIG. 6.
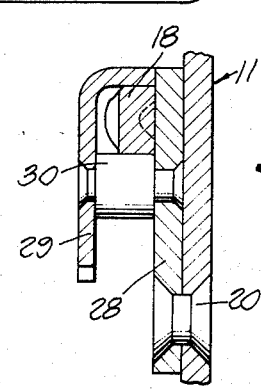
FIG. 7.
INVENTOR
GUNTHER A. BOECK
BY
ATTORNEYS

SELF-LOCKING LATCH MECHANISM

This invention relates to holding devices and more particularly to an improved, rugged, self-locking, latch mechanism which must be manually held retracted before it is possible to move one of the latch subassemblies relative to the other.

The present invention is particularly useful to control sliding drawers but has numerous other applications as will be readily apparent from the description which follows. In many operating environments involving the use of relatively sliding structures, it is crucially important that these structures be provided with positive highly reliable means for locking them in any of many different positions between their fully retracted and extended positions.

Such latching means must be capable of absorbing powerful shock forces, vibration and sudden shifts without risk of becoming released. A typical operating environment where the risks are particularly prevalent is in aircraft and watercraft. Such craft carry innumerable items mounted on chassis or the like having sliding support in housing structure, as for example, instrumentation of all kinds, navigation equipment and electronic gear. In the referred to environments, space is usually at a premium and the air or water-borne craft is subject to sudden and radical changes in attitude. Safety of the equipment as well as of the crew or other occupants of the craft are of paramount importance. Yet it is equally important that ready and instant access be had to the equipment by extending it into narrow companionways for servicing, inspection and maintenance purposes.

Many attempts have been made heretofore to provide latching devices suitable for use on sliding equipment to hold that equipment in various open positions but these attempts have fallen far short of desirable objectives and the shortcomings of such prior equipment has led to serious consequences both as respects equipment and the safety of personnel.

It is therefore a primary objective of the present invention to provide simple, economical, highly reliable latching mechanism capable of withstanding the rugged operating requirements typically encountered in both air and water craft.

Another object of the invention is the provision of a simple, self-contained latching mechanism readily installed on relatively sliding structures and automatically effective to lock the parts in any adjusted position and releasable therefrom only by the deliberate manual act of a person having knowledge of the latched mechanism operation.

Another object of the invention is the provision of a self-locking, latching mechanism installable on sliding equipment mounted on ball-bearings and capable of positively locking the equipment in any adjusted position until such time as it is manually released.

Another object of the invention is the provision of a self-locking latch mechanism utilizing a rack gear in combination with a toothed latch member movably connected with spring actuated control means for locking the latch teeth positively engaged with the rack gear until deliberately released.

Another object of the invention is the provision of a telescopic ball-bearing slide support for a drawer in combination with a self-locking latch mechanism for locking the telescopic slide in any adjusted position therealong.

These and other more specific objects will appear upon reading the following specification and claims and upon considering in connection therewith the attached drawing to which they relate.

Referring now to the drawing in which a preferred embodiment of the invention is illustrated:

FIG. 1 is a side elevational view of one preferred embodiment of the invention operatively associated with a roller-bearing-equipped chassis drawer and showing the chassis latched partially open;

FIG. 2 is a front elevational view of FIG. 1;

FIG. 3 is a fragmentary cross sectional view on an enlarged scale taken along line 3—3 on FIG. 1;

FIG. 4 is a fragmentary side elevational view of the latch mechanism per se shown in locked position;

FIG. 5 is a view similar to FIG. 4 but showing the latch unlocked; and

FIGS. 6 and 7 are fragmentary cross sectional views taken respectively on lines 6—6 and 7—7 on FIG. 4.

Referring initially more particularly to FIGS. 1 and 2, there is shown a typical rigid cabinet structure 10, provided with one or more drawer-like equipment chassis 11 supported in the frame of cabinet 10 on telescopic roller bearing slide assemblies 12 of well known design. Chassis drawer 11 may be of the type commonly used to support electronic gear and other instrumentation and, except for the front panel 13, is normally fully housed within the cabinet structure. Such chassis drawers are normally provided with pull grips 14, there being a pair of these grips secured to the front panel along its opposite lateral edges.

Chassis drawer 11 is equipped with a pair of the invention latching mechanisms designated generally 15, the latch mechanism subassembly being suitably securely mounted along either side of chassis 11 and the cooperating elongated rack gear subassembly 16 being securely anchored to the rigid cabinet structure 10, as will be described presently. Latch mechanism 15 includes an actuator having a long operating rod 18 extending along the length of chassis 11 and terminating in a push button 19 on the outer face of the chassis panel 13. Desirably, push button 19 is located in a convenient position to be pressed inwardly by the operator's thumb while his fingers are grasping one of the hand grips 14.

Referring now to FIGS. 3–7, details of the latch mechanism subassembly 15 will be described. As there shown, this subassembly is mounted along the side of chassis 11 closely parallel to the upper edge of the telescoping slide mechanism 12 in the manner best shown in FIG. 3, the toothed rack gear subassembly 16 being rigidly secured by screws or otherwise to the interior end wall of cabinet 10 and latch mechanism 15 being similarly secured to the side of chassis 11, as by rivets 20. Before proceeding to describe the latch in detail it is pointed out that the conventional ball-bearing slide for the chassis as here shown comprises an inner channel member 22, an intermediate channel member 23, and an outer channel member 24 held in assembled relation to one another by a multiplicity of captive ball bearings 25. The smaller channel member 22 is secured to chassis 11 whereas the larger member 24 is secured to the cabinet frame. Since such slide structures are well known to the hardware art and since the details of these assemblies are not per se a feature of the present invention, a further description is not necessary for an understanding of this invention.

Latch mechanism 15 includes a U-shaped main frame, as viewed from one end, and includes a rigid plate 28 and an L-shaped face plate 29 held rigidly assembled by combined stops and spacer rivets 30. As is made clear by FIGS. 6 and 7, these spacers hold the two legs of the U-shaped housing rigidly separated and in parallel relation to one another. It will also be observed that the back wall member 28 of the frame projects downwardly below the lower edge of member 29 and it is this extension which seats the mounting rivets 20 for the latch subassembly.

The left hand end of frame member 28 is provided with an elongated slot 32 having a close sliding fit with a projection 33 (FIG. 6) of latching member 34. The lower edge of member 34 is provided with a plurality of teeth 35 complemental in shape to teeth 36 distributed along the adjacent edge of rack gear 16.

Latching member 34 is shifted vertically along slot 32 by means of the reciprocable latch actuator 18, the right hand end of which is contoured as shown in FIGS. 4 and 5 and has a loose sliding fit between the legs of the U-shaped main frame 28,29. This actuator is operatively connected to latch 34 by a U-shaped pivoting link 38. The legs of this link comprise pins, one of which is journalled in actuator 18 and the other in latch member 34 in the manner best shown in FIG. 6. The juxtaposed edges 18a of actuator 18 and 34a of latch member 34 are contoured as shown in FIGS. 4 and 5 and cooperate to provide a positive mechanical lock effective to lock member 34 positively engaged with the teeth 36 of rack gear 16 when actuator 18 is in its normal retracted position. In FIG. 4, these members are positively locked in meshed condition whereas, in FIG. 5, actuator 18 is shifted to its unlocked position and latch member 34 is shown elevated with its teeth 35 clear of the rack gear teeth 36.

The means for holding the latch normally in locked position comprises a stiff compression spring 40 surrounding actuator 18 with one end bearing against a washer 41 resting against the adjacent end of frame members 29,29. The other end of the spring bears against a washer 42 and a transverse rivet 43 carried by actuator 18.

The operation of the invention latching mechanism will be evident from the foregoing detailed description. Normally, latch spring 40 holds actuator 18 in its locked position with notch 30b of the actuator resting against the adjacent one of stops 30 (FIG. 4) and with the relatively flat portion 18a of the actuator bearing against the relatively flat portion of camming surface 34a on the upper end of latch member 34. Under these conditions it will be apparent that it is impossible for latch member 34 to become disengaged from the rack gear teeth 36 until and unless actuator 18 is shifted horizontally to the left wherein the parts are positioned as shown in FIG. 5. Under these conditions the latch member is held elevated by the pivoting link 38. Since the projection 33 on the rear face of the latch member can only move along slot 32, link 38 is forced to pivot clockwise about its upper pivot connection with the actuator. This unlatching movement of the latch member is not possible until the operator deliberately and manually depresses button 19 to the left as viewed in FIG. 1.

So long as the operator manually holds the actuator so depressed in opposition to the action of compression spring 40, the latch member 34 is held upwardly and chassis 11 may be shifted to any position along the length of rack gear 16. Instantly that button 19 is released spring 40 shifts the actuator to the right, causing teeth 35 to mesh with rack teeth 36 and lock the chassis against further movement. If perchance the flat ends of teeth 35 and 36 should seat against one another, the slightest movement of the chassis inwardly or outwardly will shift the teeth into mating position, whereupon spring 40, taken together with the camming action of surfaces 18a and 34a as well as the pivoting movement of link 38, causes the teeth to mate quickly and positively in a positively mated and locked condition until manually released by depressing both of the buttons 19.

While the particular self-locking latch mechanism herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

I claim:

1. A self-locking latch mechanism for use in locking a slidably supported drawer-like structure selectively and positively closed and in any selected open position, said mechanism comprising a main frame subassembly supporting movable latch means, toothed rack gear subassembly means, means for supporting said main frame and said rack gear subassemblies for linear movement relative to one another lengthwise of said rack gear subassembly, means continually urging said latch means into locking engagement with the juxtaposed teeth of said rack gear, actuator means including means movable into direct engagement with a juxtaposed portion of said latch means when engaged with said rack gear means and operable to positively lock said latch means against movement until deliberately released, and said actuator means being manually manipulatable and releasable from said latch means thereby disengaging said latch means from said rack gear.

2. A latch mechanism as defined in claim 1 characterized in the provision of means for restricting the movement of said movable latch means substantially to linear movement normal to the length of said rack gear subassembly.

3. A latch mechanism as defined in claim 2 characterized in that said actuator means is reciprocable crosswise of the path of movement of said latch means and includes a camming surface engageable with said latch means and cooperating therewith and with said main frame subassembly to lock said latch means positively engaged with the teeth of said rack gear subassembly.

4. A latch mechanism as defined in claim 3 characterized in the provision of swinging link means interconnecting said actuator means and said latch means and operable to reciprocate said latch means in a linear path lying at an angle to the path of movement of said actuator means.

5. A latch mechanism as defined in claim 4 characterized in that said latch locking means locks said latch means positively engaged with said rack gear subassembly so long as said actuator means is held in the normal position thereof by said means constantly acting to engage the teeth of said latch means and of said rack gear subassembly.

6. A latch mechanism as defined in claim 1 characterized in the provision of means for securing said main frame subassembly to slidably supported structure, and means for securing said rack gear subassembly to stationary support means for said last named structure with the teeth of said latch means movable past the teeth of said rack gear subassembly.

7. A latch mechanism as defined in claim 4 characterized in that said swinging link means comprises a U-shaped member having parallel legs one of which is journalled in said actuator means and the other of which is journalled in said latch means.

8. A latch mechanism as defined in claim 7 characterized in that said main frame subassembly embraces and holds in assembled relation said latch means and the adjacent end of said actuator means and said link means.

9. A self-locking latch mechanism having a U-shaped main frame, a toothed latch member mounted for limited movement between and parallel to the legs of said main frame, actuator means captively mounted between the legs of said main frame for limited linear movement and operatively connected with said latch member to move the same between the locked and unlocked positions thereof, an elongated rack gear means adapted to be mounted close to and parallel to the path of the teeth of said latch member and having teeth mateable with said toothed latch member, spring means operable to urge said actuator means constantly toward the normal locking position thereof, and said actuator means including means movable into direct engagement with a juxtaposed portion of said latch member when engaged with said rack gear means and operable to positively lock said latch member against movement until deliberately released.

10. A latch mechanism as defined in claim 9 characterized in that said actuator means and said latch member have cooperating juxtaposed camming surfaces cooperable to positively lock said latch member in the locking position thereof when said actuator means is held in the normal position thereof by said spring means.

11. A latch mechanism as defined in claim 9 characterized in that said latch member and said actuator means therefor are so constructed and arranged within said main frame that the movement of each thereof occurs generally at right angles to one another.

12. A latch mechanism as defined in claim 11 characterized in the provision of a pair of stops between the legs of said main frame positioned in the path of movement thereof and effective to limit the reciprocable movement of said actuator means.

13. A latch mechanism as defined in claim 11 characterized in that said latch means and said actuator means therefor include linkage means pivotally connected at its opposite ends to a respective one of said last mentioned means.

14. A latch mechanism as defined in claim 12 characterized in that said stop means bridge the gap between the legs of said main frame and are positioned to hold said legs assembled in spaced apart parallel relation.

15. A latch mechanism as defined in claim 9 characterized in that one leg of said main frame extends beyond the other of said legs and includes means for securing said main frame rigidly to a support therefor.

* * * * *

UNITED STATES PATENT OFFICE
CERTIFICATE OF CORRECTION

Patent No. 3,700,301          Dated October 24, 1972

Inventor(s) Gunther A. Boeck

It is certified that error appears in the above-identified patent and that said Letters Patent are hereby corrected as shown below:

Column 4, line 45, after "gear", insert -- while moving said main frame subassembly into a different position lengthwise of said rack gear subassembly. -- .

Signed and sealed this 20th day of March 1973.

(SEAL)
Attest:

EDWARD M. FLETCHER, JR.
Attesting Officer

ROBERT GOTTSCHALK
Commissioner of Patents